United States Patent
Struijk et al.

(10) Patent No.: US 9,862,005 B2
(45) Date of Patent: Jan. 9, 2018

(54) APPARATUS AND METHOD FOR SORTING PLANT MATERIAL UNITS

(71) Applicant: IG SPECIALS B.V., Gameren (NL)

(72) Inventors: Wim Struijk, Delwijnen (NL); Wim Van der El, Ameide (NL)

(73) Assignee: IG SPECIALS B.V., Gameren (NL)

( * ) Notice: Subject to any disclaimer, the term of this patent is extended or adjusted under 35 U.S.C. 154(b) by 0 days.

(21) Appl. No.: 14/901,092

(22) PCT Filed: Jun. 25, 2014

(86) PCT No.: PCT/EP2014/063453
§ 371 (c)(1),
(2) Date: Dec. 28, 2015

(87) PCT Pub. No.: WO2014/207073
PCT Pub. Date: Dec. 31, 2014

(65) Prior Publication Data
US 2016/0144408 A1    May 26, 2016

(30) Foreign Application Priority Data
Jun. 28, 2013  (NL) .................................. 2011066

(51) Int. Cl.
*B07C 5/342*    (2006.01)
*B07C 5/38*     (2006.01)
*B25J 11/00*    (2006.01)

(52) U.S. Cl.
CPC ............ *B07C 5/342* (2013.01); *B07C 5/38* (2013.01); *B25J 11/00* (2013.01)

(58) Field of Classification Search
CPC ............ B25J 11/00; B07C 5/38; B07C 5/342
(Continued)

(56) References Cited

U.S. PATENT DOCUMENTS

| 1,928,185 | A | * | 9/1933 | Morris | .................... B07B 13/00 209/705 |
| 7,600,642 | B2 | * | 10/2009 | Deppermann | ............ B07C 5/36 209/552 |

(Continued)

FOREIGN PATENT DOCUMENTS

WO         02/16090 A2    2/2002
WO    2008/150903 A1   12/2008

OTHER PUBLICATIONS

Priority Search Report for NL2011066 dated Mar. 18, 2014.
(Continued)

*Primary Examiner* — Terrell Matthews
(74) *Attorney, Agent, or Firm* — Ramin Amirsehhi; David P. Owen; Hoyng Rokh Monegier LLP

(57) ABSTRACT

The invention relates to a method and apparatus for sorting plant material units (101), such as seedlings. The plant material units are arranged in a supply tray and distributed over a plurality of further trays, each further tray being dedicated to plant material units with a specific classification value assigned to it. In the method, first, the supply tray (105) is provided. An image of the plant material units in the supply tray is obtained, and on the basis of the obtained image, a classification value is assigned to each of the plant material units. Finally, the plant material units are sorted on the basis of the assigned classification value by transferring plant material units with the same assigned classification value by means of a robot directly from the supply tray to the corresponding further tray.

20 Claims, 8 Drawing Sheets

(58) Field of Classification Search
USPC .................................................. 209/552, 580
See application file for complete search history.

(56) References Cited

U.S. PATENT DOCUMENTS

| | | | |
|---|---|---|---|
| 8,869,990 B2* | 10/2014 | Skyum | A22C 17/008 177/245 |
| 9,066,615 B2* | 6/2015 | Song | B25J 11/008 |
| 9,082,071 B2* | 7/2015 | Skaff | G06N 7/005 |
| 9,123,013 B2* | 9/2015 | Gotou | G06Q 10/08 |
| 2007/0207485 A1 | 9/2007 | Deppermann et al. | |
| 2012/0020531 A1 | 1/2012 | Owens, Jr. | |
| 2013/0021469 A1 | 1/2013 | Conrad et al. | |
| 2013/0266205 A1* | 10/2013 | Valpola | B25J 9/1669 382/153 |
| 2014/0173769 A1* | 6/2014 | Leyns | A01G 7/00 800/260 |
| 2014/0284254 A1* | 9/2014 | Berdelle-Hilge | B07C 3/02 209/552 |
| 2016/0228921 A1* | 8/2016 | Doublet | B07C 5/3416 |
| 2016/0346811 A1* | 12/2016 | Iino | B07C 5/3422 |

OTHER PUBLICATIONS

International Search Report for PCT/EP2014/063453 dated Sep. 11, 2014.
International Preliminary Report on Patentability for PCT/EP2014/063453 dated Dec. 29, 2015.

* cited by examiner

APPARATUS AND METHOD FOR SORTING PLANT MATERIAL UNITS

CROSS REFERENCE TO RELATED APPLICATIONS

This application is a 35 U.S.C. 371 National Phase Entry Application from PCT/EP2014/063453, filed 25 Jun. 2014, which claims the benefit of Dutch Patent Application No. 2011066 filed on 28 Jun. 2013, the disclosure of which is incorporated herein in its entirety by reference.

BACKGROUND OF THE INVENTION

1. Field of the Invention

The invention relates to a method for sorting plant material units. Furthermore, the invention relates to a computer readable medium, having computer readable instructions stored thereon for performing, when executed by a processor, a method for sorting plant material units. Finally, the invention relates to an apparatus for sorting plant material units.

2. Description of the Related Art

In many horticultural and agricultural applications, plant material units are transferred multiple times to improve the yield. For example, for seedlings or sprouts it is important that sufficient growing space is available. Furthermore, underdeveloped plant material units are preferably removed at an early stage to use greenhouse space as efficiently as possible.

However, transfer of plant material units, such as seedlings or sprouts, may cause damage, not only to the plant material being transferred, but also to adjacent plant material units. Therefore, it is desirable to minimize the number of transfers, as well as keep the handling time for transfer as brief as possible.

International patent application WO2008/150903 describes a system and method for sorting seeds based on identified phenotypes of the seeds. The seeds are provided in a bulk seed hopper and after dispersion onto a feed platform transferred into a seed picking reservoir. Seeds are then captured out of the seed picking reservoir and placed into a seed tray. The seed tray is imaged so that image data is available for all seeds within the seed tray. Subsequently, the image data is processed to identify seed characteristics or phenotypic traits. Based on the identified seed characteristics or phenotypic traits, the seeds are assigned to a predetermined class, and then selectively removed from the seed tray and sorted to a selected seed repository, each seed repository being designated to receive only seeds identified to have a particular one of the predetermined classes. The system and method of WO2008/150903 comprises many transfers. Furthermore, the type of transfers involves bulk transfer of seeds (e.g. on the feed platform and parallel transfer of seeds by means of a funnel under the influence of gravity from the seed tray to a selected repository), as well as bulk storage of seeds (e.g. in the seed hopper, in the seed picking reservoir, as well as in the seed repositories designed to a predetermined class). Although such handling may be suitable for seeds, transfer and/or storage of seedlings or sprouts in such a way would result in high probability of plant material damage, which is undesirable.

US-patent application 2013/0021469 describes a method and system for seed classification using spectral analysis to determine the existence of a seed structure. The method and system discuss a pattern recognition technique that may improve classification of the seeds being analyzed. US2013/0021469 does not discloses any method or system for sorting plant material units, such as seedling or sprouts.

US-patent application 2012/0020531 relates to a method of automated image analysis of an organic polarized object. In the method, the precise location and orientation of an organic polarized object, such as a seed or bulb, is identified to enable pick-up and placement by a robot

BRIEF SUMMARY OF THE INVENTION

It is an object of the invention to provide a method of sorting plant material units that is efficient in both time and handling. For this purpose, embodiments of the invention relate to a method for sorting plant material units, such as seedlings, arranged in a two-dimensional array in a supply tray by distributing the plant material units over a plurality of further trays configured to accommodate plant material units in a further two-dimensional array, each further tray being dedicated to plant material units with a specific classification value assigned to it, the method comprising: supplying the supply tray; obtaining an image of the two-dimensional array of plant material units in the supply tray; assigning a classification value to each of the plant material units in the supply tray on the basis of the obtained image; and sorting the plant material units on the basis of the assigned classification value by transferring plant material units with the same assigned classification value by means of a robot directly from the supply tray to the corresponding further tray. Since the plant material units are transferred directly from the supply tray to the respective further tray, the plant material units are transferred only once, minimizing physical contact, and the corresponding risk of damage.

In such method, the use of further trays, each further tray being dedicated to plant material units of a specific assigned classification value, allows for efficient transfer of multiple plant material units a specific type at the same time without additional physical contact, that could damage the plant material units. The further trays may comprise a plurality of cells for accommodating the plant material units arranged in a two-dimensional array. Placing plant material units in the further trays may then comprise placing the plant material units in corresponding cells. In some embodiments, the plant material units are placed in a predetermined portion of the cells, the other cells remaining empty. Such placement may result in plants being spaced further apart, which gives the plant material more space for further development, e.g. for growing leafs etc. A similar result may be achieved by arranging that the distance between adjacent cells of the further tray is greater than the distance between adjacent plant material units in the supply tray.

In some embodiments, sorting the plant material units on the basis of the assigned classification value comprises: subsequently for each classification value, placing plant material units with an assigned classification value in a further tray dedicated to plant material units of said assigned classification value until all plant material units of said assigned classification value have been removed from the supply tray; and terminating said placing if all plant material units with a classification value for which a corresponding further tray is available have been placed in corresponding further trays. Sorting the plant material units in this way alleviates monitoring of the sorting process.

In some further embodiments, the method further includes, prior to placing: determining a number of plant material units in the supply tray for each classification value; and comparing the number with the available locations in the corresponding further trays for accommodating the plant material units; wherein, if the number of plant material units in the supply tray of a specific classification value exceeds the number of available locations in the corresponding further tray, said placing comprises: transferring plant material units with the specific classification value to the corresponding further tray until the corresponding further tray is occupied; subsequently for all other classification values for which a further tray is available, placing plant material units with an assigned classification value in a further tray dedicated to plant material units of said assigned classification value until all plant material units of said assigned classification value have been removed from the supply tray; and transferring remaining plant material units with the specific classification value in the supply tray to a further corresponding further tray. This enables replacement of a filled further tray by an empty tray without interrupting the sorting operation, which improves the throughput of the apparatus.

In some embodiments, the robot comprises a robot arm provided with a plurality of gripping elements, each gripping element being configured to pick-up a single plant material unit, the gripping elements being capable of simultaneously picking up adjacent plant material units in the supply tray, the method further comprising picking up the plant material units up to full capacity of the gripping elements in ascending order of number of pick-ups. By picking up the plant material units in this fashion, the capacity of the gripping elements is fully used. Furthermore, monitoring of the picking and placing is alleviated.

In some further embodiments, the method further comprises: determining a number and position of empty spaces in a further tray; identifying a full capacity portion of the empty spaces as spaces in which plant material units are placeable with the plurality of gripping elements being used at full capacity; picking up plant material units from the supply tray up to full capacity of the gripping elements and placing the plant material units in the identified empty spaces; picking up remaining plant material units to be placed in the respective further tray and placing said remaining plant material units in empty places outside the full capacity portion. By identification of a full capacity portion in a further tray, and placement of plant material units in accordance with the presence of such full capacity portion enables maximum use of the full capacity of the gripping elements.

In some embodiments, the supply tray is movable in a substantially horizontal first direction during sorting, while the further trays are stationary during sorting. This arrangement allows for efficient sorting by means of a robot. By moving the supply tray, plant material units to be placed in a specific further tray may be provided subsequently in an area close to the robot. Consequently, the robot may pick up the plant material units with minimal movement, which may reduce sorting time. Preferably, the method further comprises clamping the supply container by means of a clamping arrangement, the clamping arrangement being movable in the first direction. By clamping the supply tray, the supply tray can accelerate and decelerate more, which may further reduce the sorting time. In some embodiments, the further trays are moveable in a substantially horizontal second direction. The ability to move the different trays in different directions allows for optimizing the footprint of the apparatus being used. The first direction may be substantially perpendicular to the second direction.

In some embodiments, assigning a classification value to each of the plant material units within the two-dimensional array of plant material units is based on the number of pixels within a predetermined color range per plant material unit in the image. Assigning a classification value in this way is relatively reliable, in particular if the predetermined color range is well-defined, and relatively easy to execute.

Some embodiments of the invention further relate to a computer readable medium having computer readable instructions stored thereon for performing, when executed by a processor, an embodiment of abovementioned method.

Some embodiments of the invention further relate to an apparatus for sorting plant material units, such as seedlings, arranged in a two-dimensional array in a supply tray by distributing the plant material units over a plurality of further trays configured to accommodate plant material units in a further two-dimensional array, each further tray being dedicated to plant material units with a specific classification value assigned to it, the apparatus comprising: a supply line for supplying the supply tray; multiple further supply lines for supplying the further trays; a camera system comprising one or more cameras for obtaining an image of the two-dimensional array of plant material units in the supply tray; a control unit communicatively connected to the camera system, the control unit comprising a processor for assigning a classification value to each of the plant material units within the two-dimensional array of plant material units on the basis of the image obtained with the camera system; and a robot communicatively connected to the control unit, the robot being arranged for sorting the plant material units on the basis of the assigned classification value by transferring plant material units with the same assigned classification value directly from the supply tray to the corresponding further tray. Such apparatus is efficient in both time and handling. Since the apparatus facilitates direct transfer of plant material units from the supply tray to the respective further tray, the plant material units are transferred only once, minimizing physical contact, and the corresponding risk of damage. Additionally, by supplying the further trays along supply lines different from the supply line used for supplying the supply tray, the sorting may be executed more efficiently. The robot may comprise one or more gripping elements for picking up plant material units from the two-dimensional array of plant material. The use of gripping elements enables individual pick-up of plant material units, and allows for adaptation of the gripping element for optimal pick-up and placement of specific types of plant material units with minimal risk of damage.

In some embodiments, the apparatus further comprises a clamping arrangement for clamping the supply tray, the clamping arrangement being moveable along the supply line. The clamping arrangement allows for fast movement of the supply tray along the supply line, which may reduce waiting time of the robot, thereby improving the throughput of the apparatus.

In some embodiments, the apparatus further comprises multiple discharge lines for removal of containers supplied via a corresponding further supply line. By separately removing the further trays supplied via the one or more further supply lines, further trays that are sufficiently filled with plant material units with a specific classification value assigned to them may be easily replaced with a new further tray supplied via a corresponding further supply line. Preferably, the discharge lines take the form of gravity lanes. The use of gravity lanes reduces the complexity of the apparatus. Furthermore, power consumption is reduced.

In some embodiments, the supply line for supplying the supply tray is oriented in a first horizontal direction, and one or more of the further supply lines for supplying further trays are oriented in a second horizontal direction, the first horizontal direction being different from the second horizontal direction. The ability to move different trays in different directions allows for optimizing the footprint of the apparatus being used. Furthermore, the different orientation of the supply lines may alleviate maintenance in view of easier access to different components of the apparatus. The first direction may be substantially perpendicular to the second direction. This arrangement allows for the use of a robot of limited complexity. To fully benefit from the different orientations of the different supply lines, the supply line for supplying the supply tray is located at a first height level, and the further supply lines for supplying the further trays are located at a second height level, the first height level being different from the second height level. Such placement further ensures that collisions are avoided. Most preferably, the first height level is located below the second height level. This configuration enables a more compact design. Only a relevant portion of the supply tray may be directly accessible for the robot for pickup, while all spaces of the further trays are fully accessible without the need to move such tray along the further supply line.

Preferably, at least two of the further supply lines are substantially parallel to each other and separated by a distance forming a space, the space being sufficiently large for the robot to transfer plant material units through said space.

BRIEF DESCRIPTION OF THE DRAWINGS

Various aspects of the invention will be further explained with reference to embodiments shown in the drawings wherein.

DESCRIPTION OF ILLUSTRATIVE EMBODIMENTS

The following is a description of various embodiments of the invention, given by way of example only and with reference to the drawings.

Figure 1:
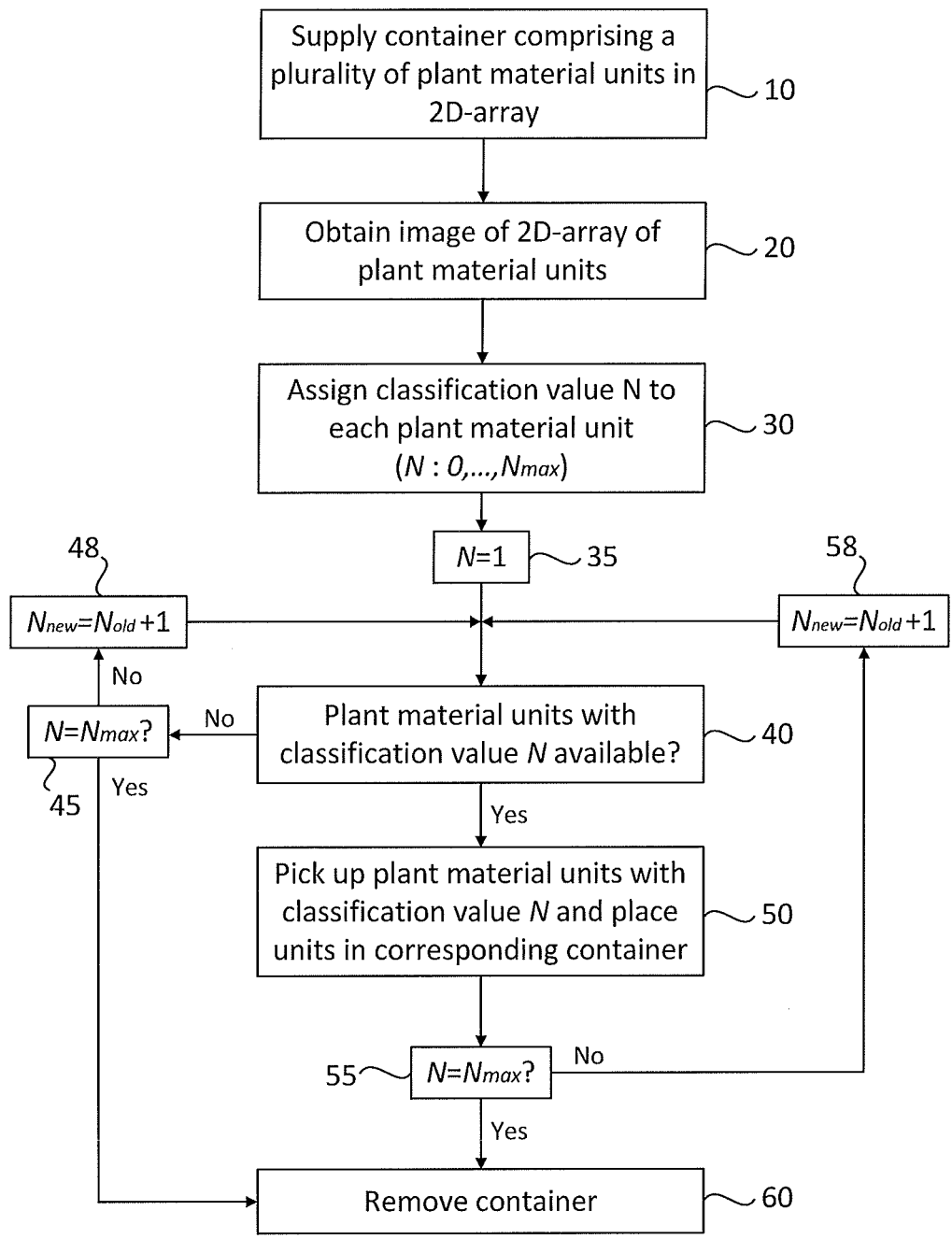
FIG. 1 shows a flow diagram of a method of sorting plant material units according to an embodiment of the invention.

FIG. 1 shows a flow diagram of a method of sorting plant material units according to an embodiment of the invention. In this embodiment, first, a container comprising a plurality of units of plant material, such as seedlings or sprouts, is supplied in action 10. The units are arranged in a two-dimensional array. Preferably, the container takes the form of a tray.

Next, in action 20, an image of the two-dimensional array of plant material units is obtained. The image is then analyzed, and as a result of such analysis, in action 30, a classification value is assigned to each of the plant material units within the two-dimensional array of plant material units. Throughout this description, the classification value is indicated by the symbol N. Preferably, the classification value represents a class of plant material units, i.e. a group of plant material units having a similar stage of development. For example, a seedling which has already developed several leafs may get a different classification value than a seedling which has not yet developed any leafs. Assigning a classification value to each of the plant material units within the two-dimensional array of plant material units may be based on the number of pixels within a predetermined color range per plant material unit in the image. For example, the number of green pixels in an image related to a specific plant material unit may be used to decide what classification value should be assigned to that plant material unit.

Please note that in this exemplary embodiment, N=0 represents the classification value given to plant material units that are not to be sorted. A plant material unit may for example be unsuitable for further processing if it has insufficiently developed. Furthermore, please note that in this exemplary embodiment, $N_{max}$ corresponds to the highest classification value that is being used. For example, if supplied plant material units are to be sorted in accordance with three classes, $N_{max}$ equals three.

After assigning a classification value in action 30 the plant material units may be sorted in accordance with their classification value in the following way.

First, in action 35, the classification value to be considered is set to one, i.e. N=1. Subsequently, in action 40, a check is made whether or not one or more units with plant material have a classification value N equal to 1 assigned to it.

If the answer in action 40 is "No", i.e. no such plant material units are present in the supplied two-dimensional array of plant units, the classification value N is compared to the maximum available classification value $N_{max}$ in action 45. If the classification value N is smaller than $N_{max}$, the classification value N, now being denoted as $N_{old}$, is incremented in action 48, so that the new classification value N being considered, i.e. $N_{new}$, equals 2.

If the answer in action 40 is "Yes", i.e. there are plant material units with a classification value N equal to 1 present in the two-dimensional array of supplied plant material units, these plant units are, in action 50, picked up and placed in a container arranged for accommodating units with this particular classification value. After placement of these plant material in the container assigned to classification value N=1, the classification value N is compared to the maximum available classification value $N_{max}$ in action 55. Again, if the classification value N is smaller than $N_{max}$, the classification value N being used in the method is incremented, in this case in action 58, so that the new classification value that is considered equals 2.

In abovementioned scenario, in which the new classification value N equals 2, actions 40, and if plant material units with classification value N equal to 2 are present in the supplied two-dimensional array, action 50 is executed as well. If $N_{max}$ is greater than 2 similar actions are to be performed for N=3, etc.

However, if the classification value N under consideration equals the maximum classification value $N_{max}$, the result of action 45 or 55 is that the method no longer executes any sorting action. Instead, the container used for the supply of the plant material units, optionally still containing left-over plant material units, i.e. in this exemplary embodiment the plant material units having a classification value N equal to zero, is removed in action 60.

Subsequently, a new two-dimensional array of plant material units may be supplied in a new action 10, etc.

In the exemplary embodiment described above, the plant material units are sorted in subsequent order, in particular in an ascending order. Of course, it may be possible to sort in a different way, for example in a descending order, or in a more random way, based on the degree of filling of containers assigned to a specific classification value. Using an ascending or descending order in the procedure has the advantage that in case of malfunctions, it is relatively easy to detect to what stage the sorting progressed at the time of the malfunction.

Furthermore, the exemplary embodiment described above is particularly applicable in cases where the containers assigned to a specific classification value have sufficient space to accommodate the plant material units assigned to them. If a container containing plant material units of a specific classification value is full, this container will be replaced by an empty container. Since such replacement takes some time, the method of sorting may, during the time of such replacement, choose to pick and place plant material units from the two-dimensional array having a classification value different from the classification value of the replaced container. If the new container is in place, the method of sorting may continue with picking and placing plant material units in the newly placed container. Abovementioned shift of priority helps to further reduce the time needed to sort plant material units within the two-dimensional array being supplied over the respective containers assigned to different classification values.

In abovementioned method, by imaging and classifying the plant material units while they are placed in a two-dimensional array, as well as directly transferring them from the two-dimensional array to the respective classification value containers, the sorting of plant material units is executed in an efficient manner, while limiting the number of transfers for each plant material unit to one. The plant material units are thus sorted by direct transfer from a supply tray to a tray dedicated to plant material units to which a specific classification value has been assigned.

Figure 2:
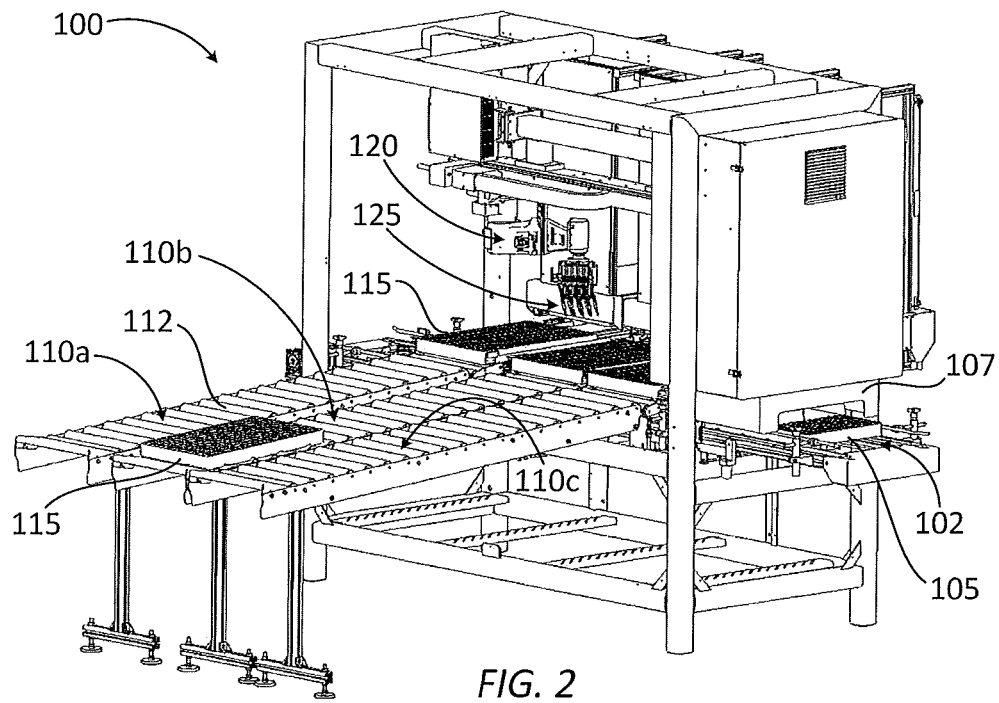
FIG. 2 shows a side view of an apparatus for sorting plant material units according to an embodiment of the invention.

FIG. 2 shows a side view of an apparatus 100 for sorting plant material units according to an embodiment of the invention. The apparatus 100 comprises a supply line 102 for supply of a container comprising plant material units arranged in two-dimensional array. Preferably, the plant material units are placed in a tray 105. The supply line 102 is configured to move the container 105 in a predetermined horizontal direction, either forwards or backwards. For this purpose the supply line 102 may include a conveyor belt or the like onto which the tray 105 is placed. Further details with respect to an exemplary embodiment of a supply line 102 will be described with reference to FIG. 6.

The apparatus 100 further includes a camera system 107. The camera system 107 includes one or more cameras. The one or more cameras of the camera system 107 are arranged for obtaining an image of the supplied two-dimensional array of plant material units. Further details regarding an exemplary embodiment of a camera system will be described with reference to FIG. 9. An example of an image obtained by a camera system 107 is depicted in FIG. 10. An image provided by the camera system 107 may be any type of suitable image including 2-dimensional images and 3-dimensional images. In case of 3-dimensional imaging, the camera system 107 generally includes more than one camera.

The apparatus 100 further includes a container transfer system arranged for transferring a plurality of containers 115 in parallel, each container 115 being assigned to accommodating plant material units having a specific classification value assigned to them. The classification may depend on the stage of growth of the plant material being sorted.

The shape and size of the containers 115 may vary per classification. For example, if the containers 115 take the form of a tray provided with a plurality of openings or depressions for accommodating a plant material unit, the pitch of the respective openings or depression may vary. In particular, a container 115 to be used to carry well-developed seedlings may have depressions that are spaced further apart than a container 115 to be used to carry seedlings that developed to a lesser extent.

In the embodiment depicted in FIG. 2, the apparatus 100 comprises three parallel discharge lines 110a, 110b, 110c. In the shown embodiment, the discharge lines 110a, 110b, 110c take the form of gravity lanes, i.e. strips comprising a plurality of rollers 112 placed in parallel to each other, each subsequent roller being located at a slightly lower height with respect to the previous roller, so as to enable movement of the container 115 over the rollers 112 in a predetermined direction under the influence of gravity.

The apparatus 100 further comprises a robot 120 provided with one or more gripping elements 125 for picking up plant material units from the two-dimensional array of plant material units as supplied and placing these plant material units according to the classification value assigned to them in the corresponding container 115. The term gripping element should be understood to include any type of gripper, including but not limited to mechanical grippers and suction cups.

Figure 3:
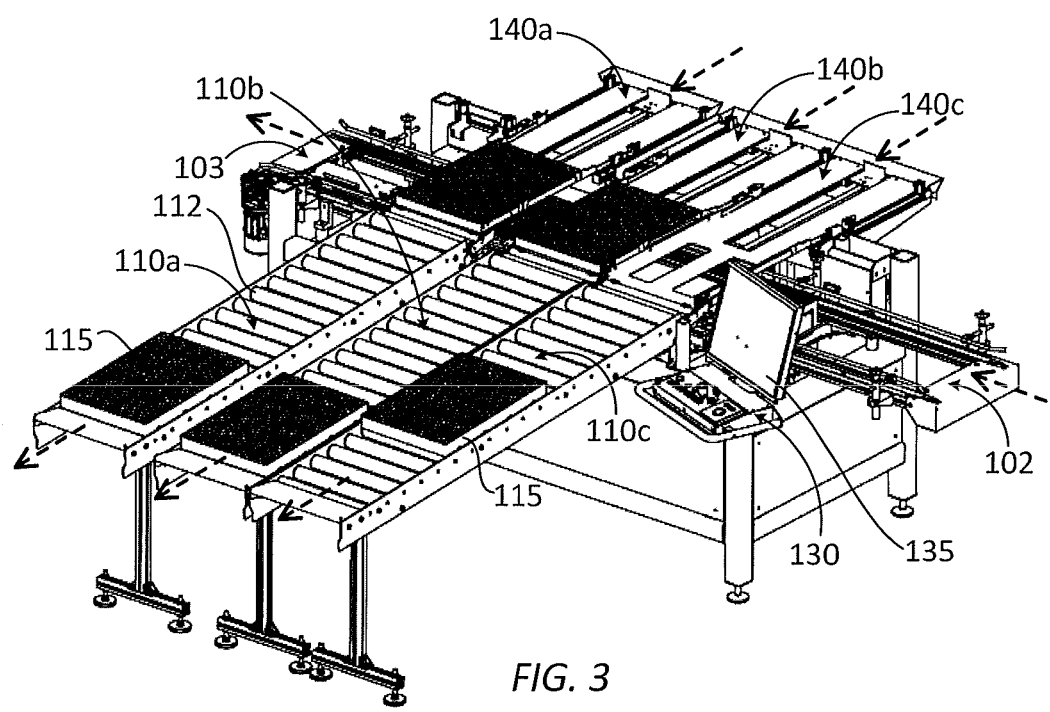
FIG. 3 shows an elevated side view of a portion of the apparatus of FIG. 2.
Figure 4:
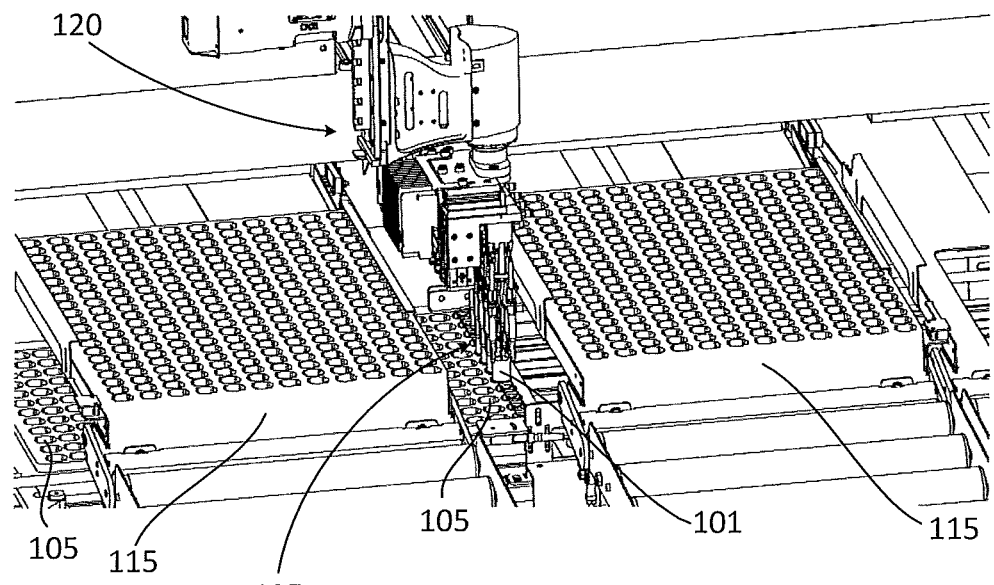
FIG. 4 shows an elevated side view of another portion of the apparatus of FIG. 2.

The optimal orientation of the supply line 102 with respect to the containers 115, and the corresponding discharge lines 110a, 110b, 110c may highly depend on the type of robot being used for transfer of the plant material units. FIG. 3 shows an elevated side view of a portion of the apparatus of FIG. 2. As depicted in FIG. 3, the supply line 102 via which the container 105 is supplied has an orientation substantially perpendicular to the orientation of the discharge lines 110a, 110b, 110c. To avoid any container collision due to a crossing of different transfer lines, the supply line 102 for transferring a container 105 is preferably placed at a different height level than the transfer lines used to transfer a container 115. Most preferably, as depicted in FIGS. 2-4 the supply line 102 is placed at a height level below the height level of the transfer lines used to transfer containers 115. Such placement enables a more compact design. As depicted in FIG. 4, only a relevant portion of the supply tray may be directly accessible for the robot for pickup, while all spaces of the further trays are fully accessible without the need to move such tray along the further supply line.

Containers 105 comprising a plurality of plant material units to be sorted are supplied via the supply line 102. After sorting, such containers 105, which may then be empty or may solely contain disapproved plant material units, are removed via discharge line 103.

At a different height level, empty containers 115 may be supplied via supply lines 140a, 140b, 140c. The containers 115 are removed from the apparatus 100 after, at least partially, being filled with a specific class of plant material units, via discharge lines 110a, 110b, 110c. Preferably, the position of the containers 105 in the supply line 102, and the position of the containers 115 in the supply lines 140a, 140b, 140c are automatically controlled. Removal of containers may be done manually, for example by means gravity lanes as shown with respect to discharge lines 110a, 110b, 110c. Automatic control of the supply of containers 105, 115 may help to improve the reliability of sorting, mainly because containers 105, 115 may be positioned accurately with respect to the robot 120.

The control of the different lines may be controlled by means of a control unit, for example present in a computer which supplies a user interface 130 for an operator and/or a display 135 to enable monitoring of one or more parameters within the apparatus. Alternatively, the control unit may take the form of any other suitable control device known to those skilled in the art. The control unit may be instructed to execute a program. The control unit is communicatively coupled to the camera system 107. The control unit may base movement of the container 105 the content of which is being sorted, as well as movement of one or more of the containers 115 for receiving classified plant material based on information obtained from the camera system 107.

The control unit may comprise a computer system comprising a processor with peripherals to enable operation of a method for sorting plant material, for example by means of an apparatus 100 as discussed above. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor. Computer readable instructions that aid the execution of a method of sorting as discussed above may be stored on a computer readable medium. The computer readable medium may then be provided to the control unit to perform, when executed by a processor in the control unit, the computer readable instructions stored thereon.

FIG. 4 shows an elevated side view of a portion of the apparatus of FIG. 2. In particular, FIG. 4 shows a more detailed view of the robot 120 being used to pick up plant material units 101 from a supply tray 105, and placing the picked-up plant material units 101 in the tray 115 to which they are assigned.

The robot 120 may comprise a robot arm with sufficient degrees of freedom to enable suitably placement of a picked up plant material unit in the suitable container 115. In some applications a robot arm having 4 degrees of freedom, i.e. 3 rotation axes, where one axis is arranged to allow transfer along the axis, is sufficient. In some other applications a more sophisticated robot arm is needed, for example in case the plant material units are vulnerable, and need to be treated with care. Such more sophisticated robot arm may be arranged to operate with 6 degrees of freedom.

The robot is placed above the supply line 102 for supplying a tray 105 comprising a plurality of plant material units 101 to be sorted in a two-dimensional array. The trays 115, which are arranged to accommodate plant material units 101 having the same classification value assigned to them, are spaced apart such that the robot 120 can pick up plant material units 101 in one or more rows of the tray 105, and can place them in the suitable tray 115.

Figure 5:
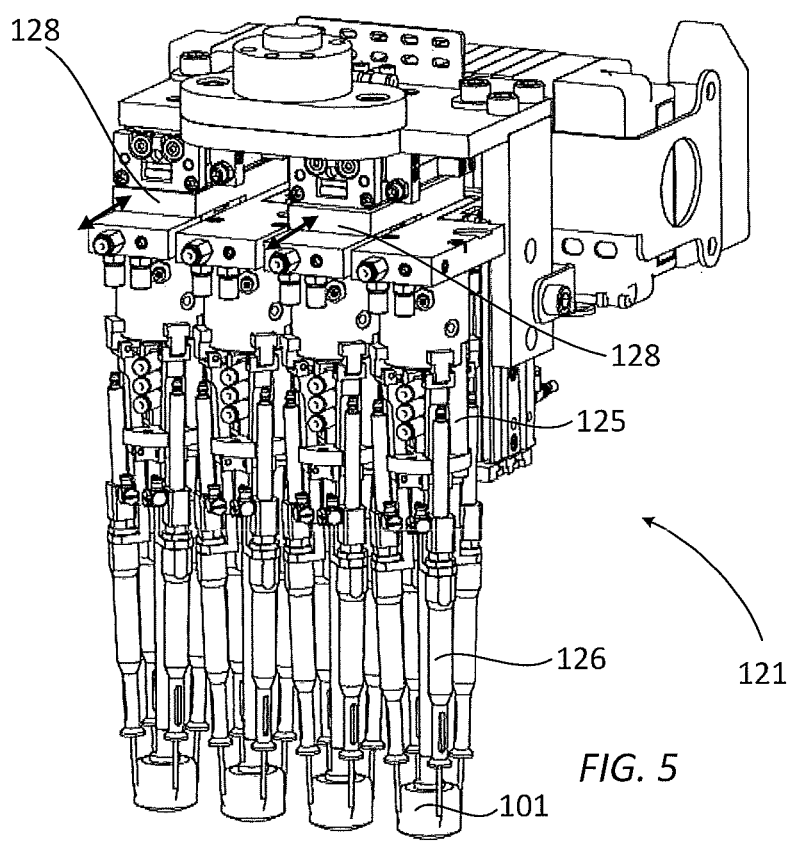
FIG. 5 shows an embodiment of portion of a robot that may be used in the apparatus of FIG. 2.

In the embodiment depicted in FIG. 4, the robot 120 comprises four gripping elements 125, each gripping element 125 being arranged for picking up a single plant material unit 101. A more detailed view of the robot arm 121 of the robot 120 provided with four gripping elements 125 is depicted in FIG. 5. The gripping elements 125 are individually controllable. In this exemplary embodiment, the four gripping elements 125 of the robot 120 form a one-dimensional gripping element array oriented in a direction substantially perpendicular to the direction in which the tray 105 can move forwards and backward along the supply line 102. This orientation allows for a relatively simple design of the robot 120. By suitable movement of the tray 105 along the supply line 102 relative to the robot 120, plant material units 101 with the same classification value in the two-dimensional array of plant material units 101 can be readily picked out of the tray 105 by the gripping elements 125 of the robot 120 in a relatively fast and efficient manner.

Preferably, the robot 120 transfers the plant material units 101 to the suitable tray 115 with all gripping elements 125 holding a plant material unit 101. Exceptions may be made for situations in which the number of remaining empty cells in (a row of) a tray 115 is lower than the number of gripping elements 125, and for situations in which the number of plant material units 101 assigned with a specific classification value present in the supply tray 105 prior to a desired transfer is lower than the number of gripping elements 125.

In situations where all gripping elements 125, in this exemplary embodiment four gripping elements, can be used during a transfer of certain plant material units 101, the order in which plant material units are picked up out of the supply tray 105 is preferably as follows. First, the robot 120 picks up groups of plant material units in the two-dimensional array forming a row of four. Next, the robot may pick up the groups of plant material units that form a row of three, and a single plant material unit to complete the row. Subsequently, the robot may pick up pairs of plant material units, and complete the sorting by picking up remaining individual plant material units with the classification value corresponding to the respective container 115. As mentioned earlier, if the respective container 115 was not completely filled by an already sorted two-dimensional array of plant material units that was supplied earlier, the robot 120 may, prior to picking up groups of four plant material units, pick up individual plant material units, pairs of plant material units or groups of three to enable easy placement of rows of four plant material units in the container 115.

In some embodiments, plant material units are picked up by the gripping elements 125 up to full capacity, i.e. all four gripping elements hold a plant material unit, in ascending order of number of pick-ups. For example, in an exemplary embodiment in which the robot arm of the robot 120 is provided with four gripping elements 125, each gripping element being configured to pick up a plant material unit, the robot 120 starts with picking up 4 plant material units that are arranged in such a way with respect to each other that they can be picked up simultaneously by the gripping elements 125. In other words, the robot 120 starts with the plant material units that may be transferred to the respective container 115 using one pick-up.

Subsequently, the robot 120 picks up the plant material units that may be picked-up with two pick-ups. This may be established by picking up three plant material units simultaneously, and a fourth plant material unit at a different time. Alternatively, two gripping elements 125 may pick-up two plant material units simultaneously, followed by the remaining two gripping elements 125 picking up two other plant material units simultaneously.

The order of pick-up, including the number of plant material units picked up per pick-up, may depend on the position of the supply container 105 prior to pick-up. For example, if a row of three plant material units 101 is located at a position easily accessible with the robot 120 without movement of the supply container 105, a single plant material unit is accessible after a shift of one row, and two pairs of plant material units are accessible after a shift of two rows, the robot 120 may first pick-up the three plant material units and then the single plant material unit. The pairs of plant material units will then be transferred in the after completion of placement of the first four plant material units. Picking up plant material units in this fashion allows for efficient sorting by means of a robot. In some embodiments, plant material units to be placed in a specific further tray are subsequently provided in an area close to the robot by moving the supply tray. Picking up the plant material units in a fashion as described above enables the robot to pick up the plant material units with minimal movement of the supply tray, which may reduce sorting time.

Subsequently, plant material units that may be picked up in three times are transferred towards the respective container 115. Again, the order of pick-up may depend on the position of the supply container 105.

Finally, remaining plant material units that need to be picked up individually, i.e. in 4 pick-ups if full capacity is still possible in view of the number of remaining plant material units to be transferred, are picked up and transferred to the respective container 115.

Note that in abovementioned procedure, it is not essential that plant material units, which are picked up simultaneously, are located adjacent to each other. For example, if two plant material units are picked up simultaneously, such pick up may be performed by the outer gripping elements 125, i.e. the middle two gripping elements not taking part in this pick-up action.

In some embodiments the method of sorting further comprises determining a number and position of empty spaces in a further tray. A portion of the empty spaces may then be identified as spaces in which plant material units are placeable with the plurality of gripping elements being used at full capacity. Such portion may be referred to as a full capacity portion. The plant material units are then picked up from the supply container 105 up to full capacity of the gripping elements and placed in the empty spaces identified as belonging to the full capacity portion. Finally, the remaining plant material units to be placed in the respective further tray are placed in empty places outside the full capacity portion. This procedure enables the robot to follow a relatively easy protocol without the need to compare the number of plant material units to be placed with the available space in the respective further tray.

In abovementioned embodiments of a method for sorting plant material units the method may further include the boundary condition that the robot 120, and in particular the gripping elements 125 thereof, are physically capable of picking up and placing the plant material units. For example, if a physical structure, such as a portion of a frame of a sorting apparatus 100 as depicted in FIG. 2, is positioned in close proximity of one of the further containers 115, it may be possible that the robot 120 can only place a plant material unit at a location in close proximity of the frame with a predetermined gripping element 125. The method may then thus include identifying locations within the supply tray and/or one or more of the further trays for which a boundary condition applies, and taking the boundary condition into account if a plant material unit is to be placed at one or more of these identified locations.

FIG. 5 shows an embodiment of a portion of a robot 120 that may be used in the apparatus of FIG. 2. In particular, FIG. 5 shows a robot arm 121 comprising four gripping elements 125 arranged in a row. Each gripping element 125 comprises four arms 126 configured to grab a plant material unit 101. It will be understood that the type and/or number of arms 126 of the gripping element 125 is not limited to the type and number depicted in FIG. 5. In the shown embodiment, two out of four gripping elements 125 are provided with a displacement system 128 for moving the gripping elements in a direction substantially perpendicular to the orientation of the row, as denoted by the double arrows. If the distance between adjacent rows in the supply tray are suitably chosen, the displaced gripping elements 128 may be able to pick up plant material units from another row than the non-displaced gripping elements 128 at the same time. Similarly, plant material units 101 may be placed in a container 115 in different rows. In some embodiments, the displacement systems 128 facilitate easy placement of plant material units 101 in a checkerboard pattern. Although merely two displacement systems 128 are depicted in FIG. 5, it may be equally well possible that more or less displacement systems 128 are present. For example, each gripping element 125 may be provided with a displacement system 128. In such embodiment, simultaneous pick-up and/or placement is possible for many different configurations of multiple plant material units.

Figure 6:
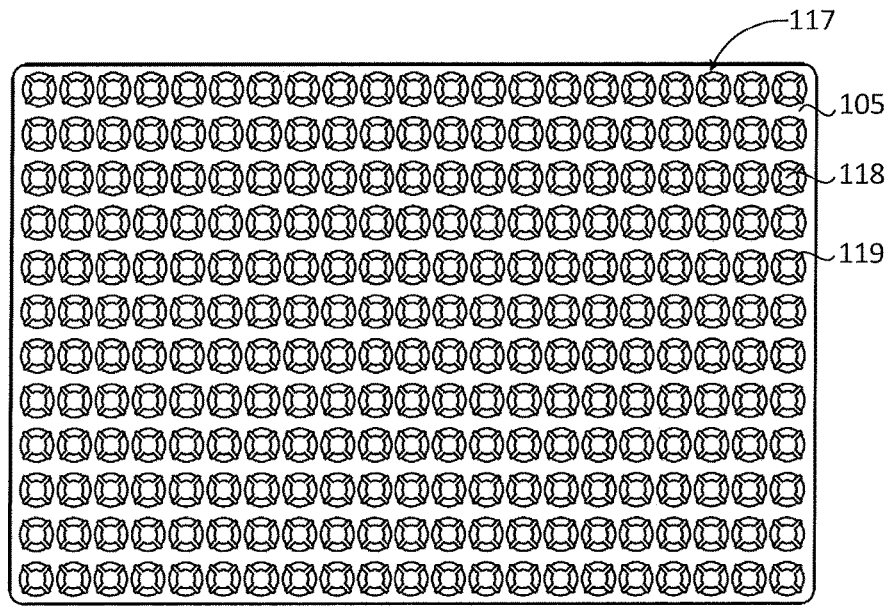
FIG. 6 shows a top view of a container for carrying a plurality of plant material units that may be used in embodiments of the invention.

FIG. 6 shows a top view of a container for carrying a plurality of plant material units that may be used in embodiments of the invention. The container takes the form of a tray 105 provided with a plurality of cells 117 forming a two-dimensional array. The cells 117 typically take the form of recesses or cavities 118 with respect to an upper surface of such tray. Preferably, a portion of the bottom surface of the cell 117 is absent so as to create an aperture. The presence of such aperture opens the possibility to lift a plant material unit 101 placed within the cell from below. Preferably, the cavities 118 of the cells 117 include a plurality of grooves 119, preferably four grooves forming a cross. The grooves 119 allow ends of a gripper element 125 to slide towards a lower position within the tray 105 to improve grip on a plant material unit 101 to be transferred.

Figure 7:
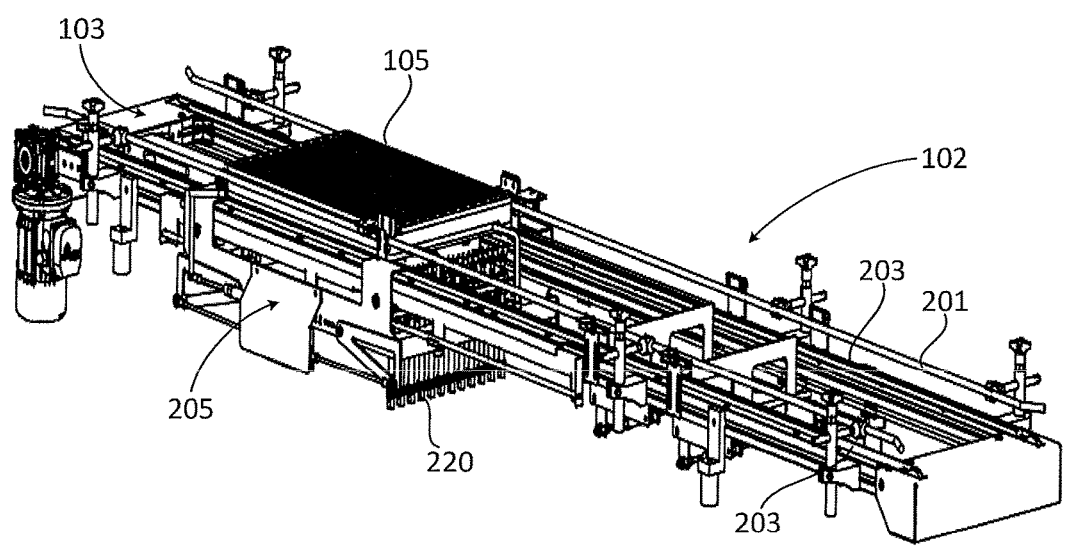
FIG. 7 shows an elevated view of an embodiment of a supply line for supplying a container comprising a plurality of plant material units arranged in a two-dimensional array.

FIG. 7 shows an elevated view of an embodiment of a supply line 102 for supplying a container 105 comprising a plurality of plant material units arranged in a two-dimensional array. In this embodiment, the supply line 102 comprises two cables 203 over which the container 105 may be led towards a position within reach of the robot. The supply line 102 further comprises one or more guiding structures, such as guiding rails 201 to guide the tray 105 along its way towards the robot.

The supply line 102 further includes a clamping arrangement 205 arranged for clamping the tray 105. The clamping arrangement 205 may be moved backwards and forwards along the supply line 102 with high acceleration and deceleration. As a result, the tray 105 being clamped by the clamping arrangement 205 may move with high acceleration and deceleration in both directions. Consequently, a robot can pick up the desired plant material units at different positions in the tray 105 within a short period of time. Further details with respect to an embodiment of the clamping arrangement 205 and its operation will be discussed with reference to FIG. 8 and FIGS. 9a-9c respectively.

The supply line 102 of FIG. 7 further includes a lifting arrangement. The lifting arrangement comprises a plurality of lifting elements 220 arranged in a row oriented in a direction substantially perpendicular to the supply line 102. Preferably, the pitch of the lifting elements 220 corresponds to the pitch of cells within the tray 105. If the cells have an open bottom, as explained with reference to FIG. 6, the lifting elements may move upwards to lift a plant material unit 101 to be transferred. By lifting the plant material unit 101, the gripper element 125 of the robot 120 can more easily pick up the plant material unit 101.

Figure 8:
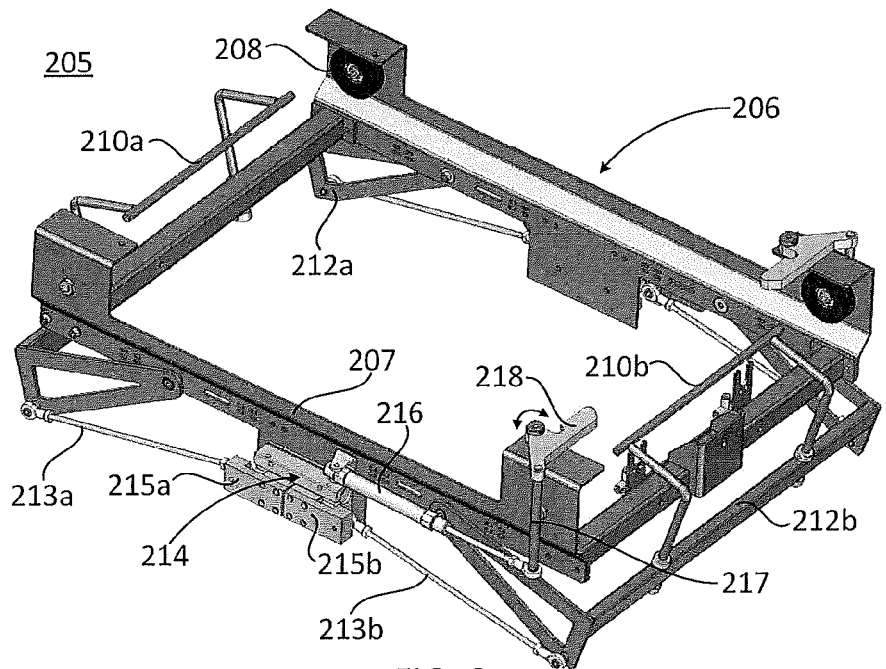
FIG. 8 shows an elevated view of a arrangement for clamping a supply tray in the supply line of FIG. 7.

FIG. 8 shows an elevated view of an embodiment of an arrangement 205 for clamping a supply tray in the supply line of FIG. 7. The clamping arrangement 205 comprises a frame 206 comprising a rigid body 207 connected to guiding wheels 208. The guiding wheels 208 are arranged to roll over a guiding rail. The guiding rails are oriented in a direction substantially parallel to the guiding rails 201 used to guide the tray 105, and may be connected thereto. The rigid body 207 has a long side substantially oriented substantially parallel to the direction of the supply line 102 and a short side substantially perpendicular to the direction of the supply line.

The clamping arrangement 205 further comprises two opposing clamping bars 210a, 210b that are connected to a corresponding clamping body 212a, 212b pivotably connected to the long ends of the rigid body 207. In this embodiment, the clamping bodies 212a, 212b are further connected to an actuation device. In the embodiment of FIG. 8, the actuation device comprises a parallel cylinder 214. Onto the parallel cylinder two coupling plates 215a, 215b have been mounted. The parallel cylinder comprises two portions connected to each other via gear elements so that the portions move in opposite directions upon activation. Consequently, activation of the parallel cylinder 214 in FIG. 8, causes the coupling plates 215a, 215b to move away from each other. The coupling plates 215a, 215b are connected to clamping bodies 212a, 212b by means of rods 213a, 213b respectively. The use of a parallel cylinder 214 connected to the pivotable clamping bodies 212a, 212b provided with clamping bars 210a, 210b respectively, allows for centration of the tray to be clamped as will be discussed with reference to FIGS. 9a-9c. As a result, trays of different lengths may be clamped with their center being at the same position. A known center position of the tray may lead to more accurate knowledge of the positions of plant material units within the tray, which in its turn may improve the placement accuracy of the robot. The actuation device may be activated in response to detection of a tray by means of one or more sensors.

The clamping arrangement 205 further comprises one or more stoppers 218 for stopping a tray 105 being supplied. In the embodiment depicted in FIG. 8, two stoppers 218 are present. The stoppers 218 may be rotated about an axis substantially perpendicular to the plane formed by the cables 203 of the supply line 202. The rotation may be done between a blocking orientation, i.e. the orientation depicted in FIG. 8, and a transmissive orientation. Actuation of rotation of the stoppers 218 may be done by means of a pressure cylinder 216, connected to a corresponding stopper 218 by means of a coupling rod 217.

Figure 9A:
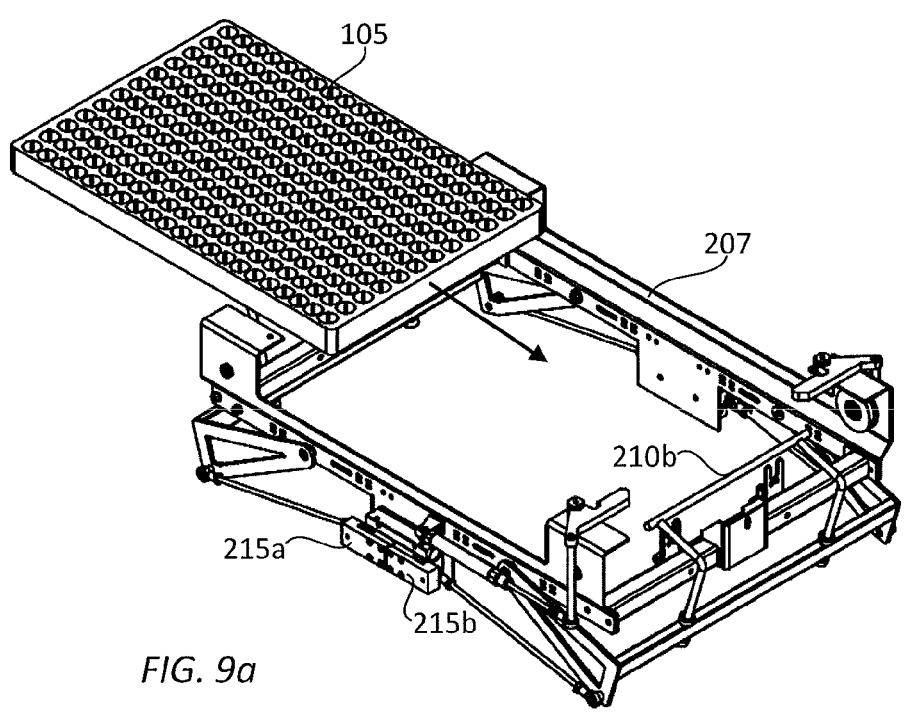
FIGS. 9a-9c demonstrate the operation of the clamping arrangement of FIG. 8.
Figure 9B:
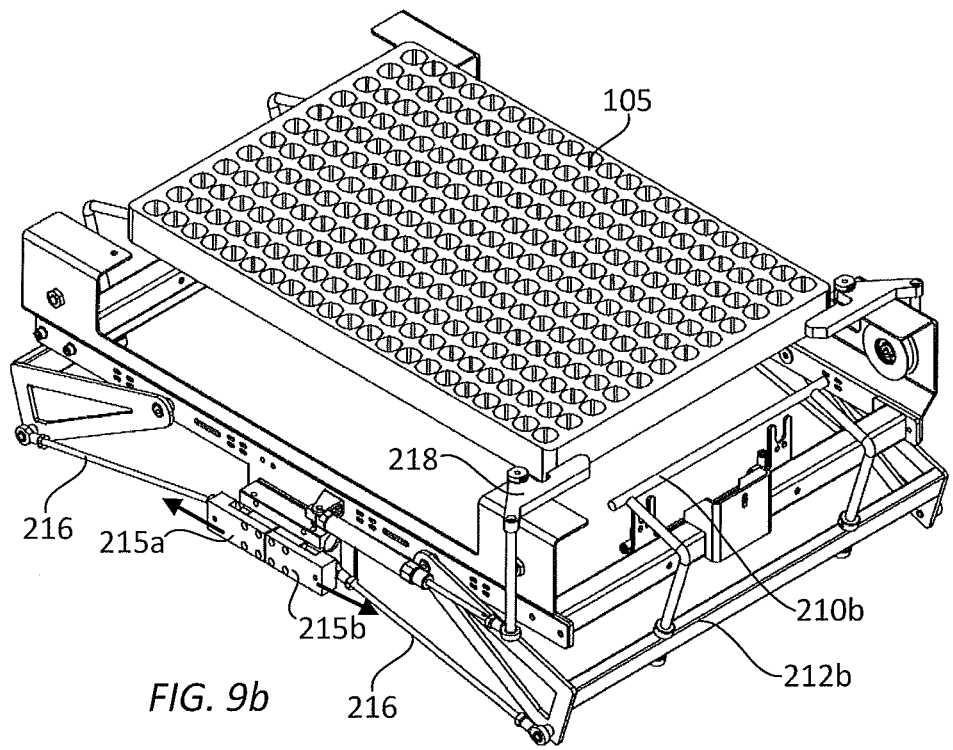
Figure 9C:
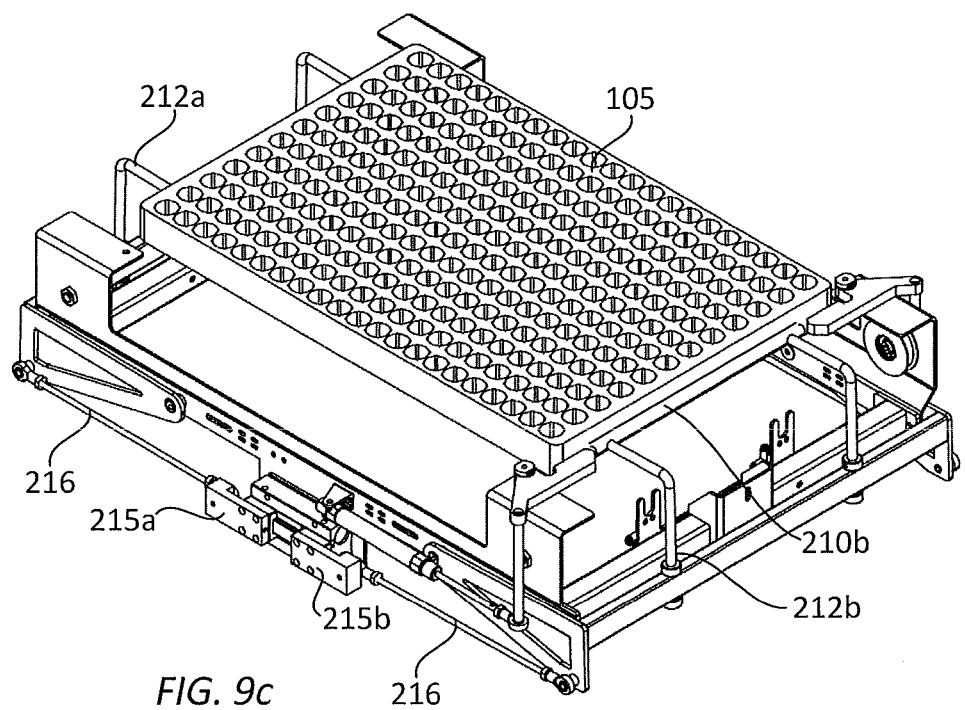
Figure 10:
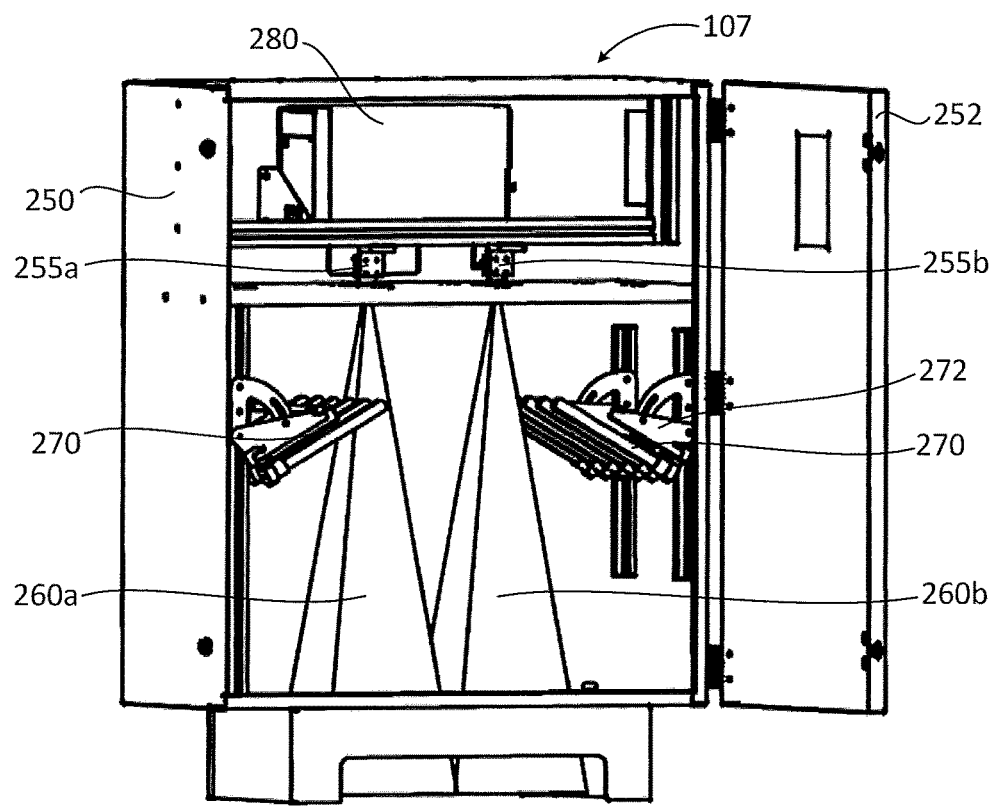
FIG. 10 shows an example of a camera system that may be used in embodiments of the invention.

FIGS. 9a-9c demonstrate the operation of the clamping arrangement 205 of FIG. 8. In FIG. 9a, a supply tray 105 accommodating a plurality of plant material units arranged in a two-dimensional array is supplied via the supply line. The supply tray 105 is stopped by the stoppers 218 resulting in the tray 105 being placed within the clamping range of the clamping arrangement 205. FIG. 9b depicts that supply tray 105 after its encounter with the stoppers 218. At this stage, the parallel cylinder 214 is activated. Such activation may be the result of detection of the presence of the tray 105 by means of one or more sensors. Upon activation, the coupling plates 215a, 215b move away from each other causing the rods 216 to move outwards as well. The outward movement of the coupling plates 215a, 215b and rods 216 causes the bodies 212a, 212b to pivot about the point at which these bodies are connected to the frame 206. As a result, the clamping bars 210a, 210b engage with the front end of the supply tray 105 and the back end of the supply tray 105 respectively. Suitable dimensioning of the different components within the clamping arrangement 205 allows for a center position of the tray 105 that is located at a predetermined position with respect to the frame 207 in a direction substantially parallel to the supply line. Knowledge of such predetermined position allows for improved tuning of the sorting apparatus regarding accurate positioning of the tray 105 with respect to the robot 120.

FIG. 10 shows an example of a camera system 107 that may be used in embodiments of the invention. The camera system 107 comprises a housing 250 provided with a door 252. In the housing 250 two cameras 255a, 255b are present, each camera being arranged for imaging a field, the boundaries of which fall within the light cones 260a, 260b respectively. Of course it may be possible to use a different number of cameras, such as one or three. The use of multiple cameras 255a, 255b enables imaging with high accuracy, caused by a high pixel density, at limited costs, due to the more limited size needed per camera.

Preferably, one or more lighting arrangements 270 are present to sufficiently illuminate the object(s) to be imaged by the cameras. The use of a lighting arrangement may enhance colors and/or contrast, which alleviates interpretation of the images obtained with the one or more cameras. The lighting arrangement may be connected to an adjustment system 272 for adjustment of the orientation of one or more lighting elements within the lighting arrangement. For different types of plant material units a different orientation of the one or more lighting elements may then be obtained, which may result in optimal illumination for each type of plant material unit to be sorted. The camera system may further comprises a processing unit 280 for processing images obtained with the one or more cameras 255a, 255b.

The one or more cameras 255a, 255b may be arranged to take an image of an entire tray 105. However, it may also be possible to image solely a portion of a tray 105, transferring the tray 105 over a predetermined distance, and then to take an image of a different portion of the tray 105. For example the camera system 107 of FIG. 10 may be arranged to take a first image which contains a first half of the tray 105. A second image may then be taken to image the second half of the tray 105. The processing unit 280 may then be arranged to suitably append the first and second images to form an image of the complete tray 105.

Figure 11:
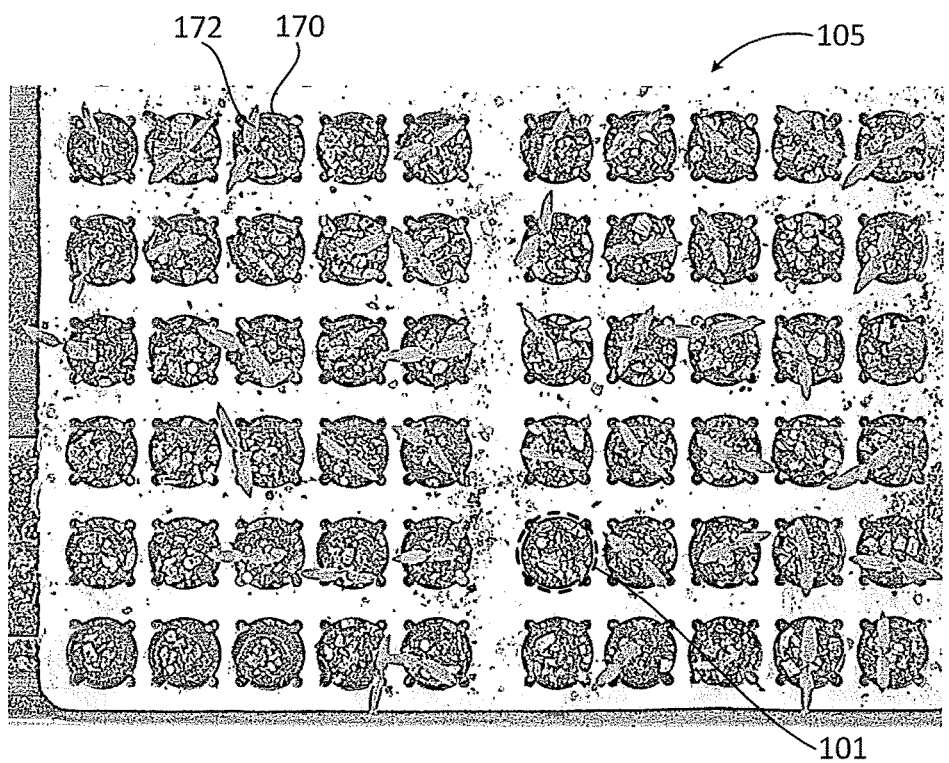
FIG. 11 shows an exemplary image of a two-dimensional array of plant material units to be analyzed.

FIG. 11 shows an exemplary image of a two-dimensional array of plant material units 101 to be analyzed. The plant material units 101 are provided in a tray 105. In this case, the plant material units comprise a growth medium 170 in which a plant 172 is developing. The plant 172 may comprises one or more leafs. The image clearly shows that the development stage of the plants 172 of the plant material units 101 varies widely.

In order to enable classification of the different plant material units 101, the image is analyzed. Preferably, the image is a color image, and allows for identification of the number of pixels within a predetermined color range per plant material unit 101. The identified number of pixels within the predetermined color range may then be used as a basis for the assignment of a classification value to the respective plant material unit 170. To avoid misinterpretation caused by e.g. weed, moss or the like, sample plant units 101 may be used to set an appropriate color range.

Unfortunately, assigning pixels to a specific plant material unit 101 may not be straightforward. For example, in a tray 105 as depicted in FIG. 11, leafs of different plant material units 101 may overlap and/or a leaf of one plant material unit 101 may cover a portion of growth medium 170 belonging to an adjacent plant material unit 101. To deal with these kinds of difficulties, several splitting rules may be defined. For example:

leafs that are completely located within an area corresponding to a specific plant material unit 101 are assigned to that plant material unit 101;

in general, if a leaf covers an area that includes a portion of at least two adjacent plant material units 101, the leaf is assigned to the plant material unit 101 which it covers the most, unless an overlap exists between leafs, in which case the area covered by overlapping leafs may partially be assigned to the different plant material units 101 involved.

Alternatively, or in addition to the approach taken above, pattern recognition techniques may be used, for example to identify the number of leafs per plant material unit 101. The identified number of leafs may then be used as input for classification and/or as input for deciding to which plant material unit 101 overlapping and/or traversing leafs are to be assigned.

Figure 12A:
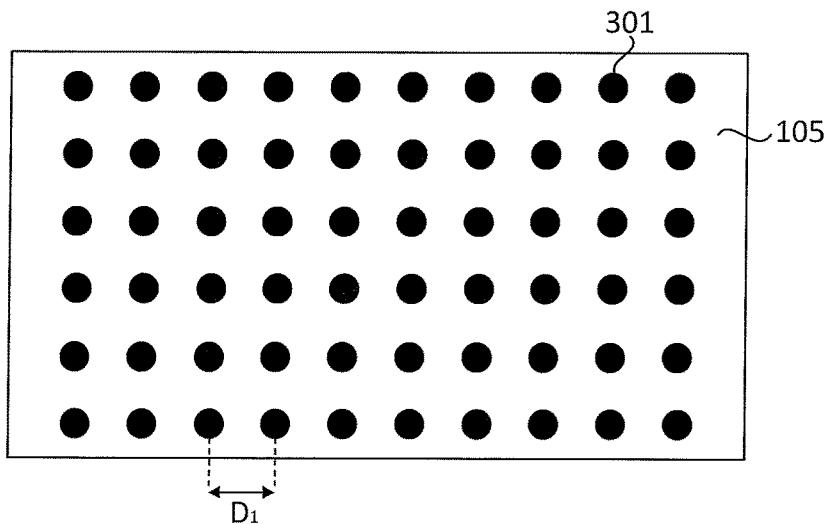
FIG. 12a schematically shows a top view of an exemplary supply container used in embodiments of the invention.

FIG. 12a schematically shows a top view of an exemplary supply tray 105 that may be used in embodiments of the invention. The tray 105 comprises a plurality of cells filled with plant material units 101 arranged in a two-dimensional array, denoted by black circles 301.

Abovementioned sorting method results in a transfer of plant material units towards further trays 115. The pitch of cells within the further trays 115 may be the same as the supply tray 105. That is, if the supply tray 105 comprises cells with a pitch $D_1$, so that plant material units therein are spaced with a distance $D_1$ apart, the further trays 115 have cells arranged at the same pitch $D_1$.

Figure 12B:
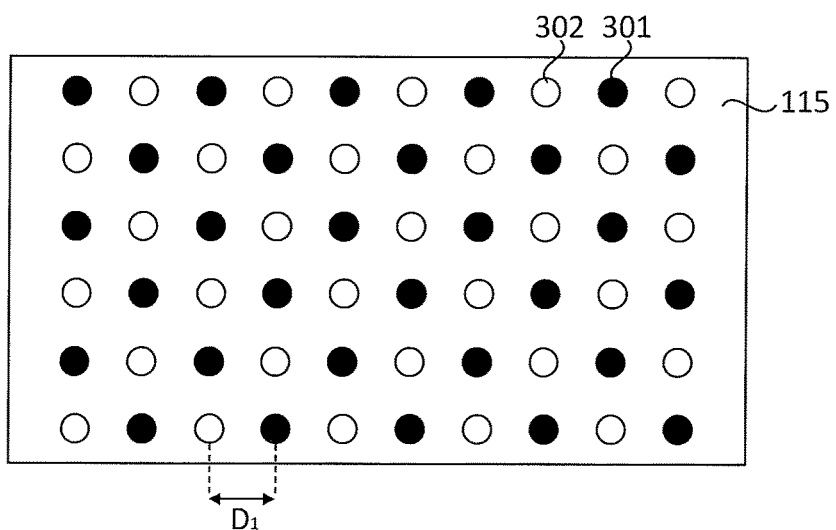
FIGS. 12b and 12c schematically show a top view of containers assigned to a specific classification value after sorting according to two different embodiments of the invention.

However, to allow the different plant material units 101 to develop further, in particular if leafs of the respective plant material units 101 in the respective tray 115 are expected to overlap in an obstructive way if placed at the same pitch $D_1$, placement may be done by incomplete filling of the tray 115 according to a predetermined pattern. For example, as depicted in FIG. 12b, the plant material units 101 may be placed in every other cell. In FIG. 12b, cells filled with a plant material unit 101 are again represented by black circles 301, whereas empty cells are represented by white circles 302. The result of filling only half of the cells in a way as described above results in the formation of a checker board pattern. Filling the cells by merely placing plant material units in only half of the cells to form a checker board pattern may be established with gripping elements 125 provided with a displacement system 128 as discussed with reference to FIG. 5. Of course, different filling ratios may be used as well, such as one cell being filled per three adjacent cells.

Figure 12C:
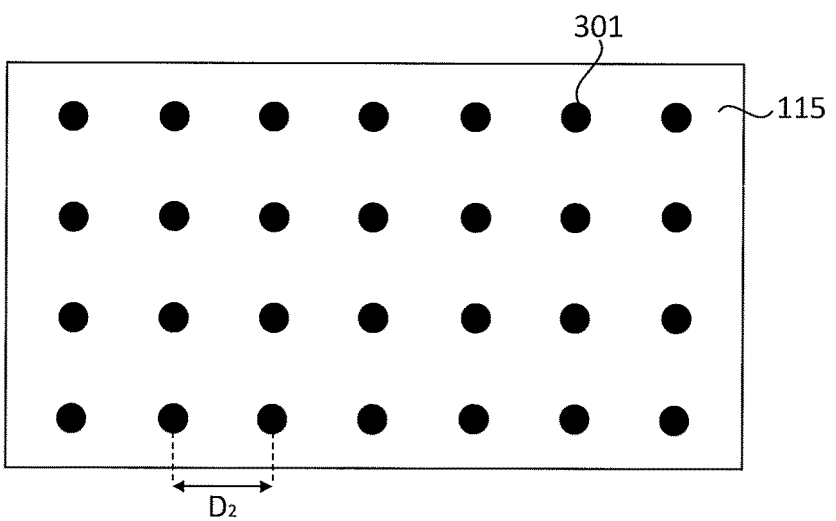

Instead of incomplete cell filling as depicted in FIG. 12b, the tray 115 for accommodating sorted plant material units 101 of the same classification value may contain cells that are spaced apart at a pitch $D_2$, pitch $D_2$ being greater than pitch $D_1$ of the supply tray cells. Such tray 115 is schematically depicted in FIG. 12c.

The invention has been described by reference to certain embodiments discussed above. It will be recognized that these embodiments are susceptible to various modifications and alternative forms well known to those of skill in the art without departing from the scope of the invention. Accordingly, although specific embodiments have been described, these are examples only and are not limiting upon the scope of the invention, which is defined in the accompanying claims.

What is claimed is:

1. A method for sorting plant material units, such as seedlings, arranged in a two-dimensional array in a supply tray by distributing the plant material units over a plurality of further trays configured to accommodate plant material units in a further two-dimensional array, each further tray being dedicated to plant material units with a specific classification value assigned to it, the method comprising:

supplying the plant material units, in said two-dimensional array in said supply tray;

obtaining an image of the two-dimensional array of plant material units in the supply tray;

assigning a classification value to each of the plant material units in the supply tray on the basis of the obtained image; and sorting the plant material units on the basis of the assigned classification value by transferring plant material units with the same assigned classification value by means of a robot directly from the supply tray to the corresponding further tray.

2. The method according to claim 1, wherein sorting the plant material units on the basis of the assigned classification value comprises:

subsequently for each classification value, placing plant material units with an assigned classification value in a further tray dedicated to plant material units of said assigned classification value until all plant material units of said assigned classification value have been removed from the supply tray; and terminating said placing if all plant material units with a classification value for which a corresponding further tray is available have been placed in corresponding further trays.

3. The method according to claim 2, further comprising, prior to placing:

determining a number of plant material units in the supply tray for each classification value; and comparing the number with the available locations in the corresponding further trays for accommodating the plant material units;

wherein, if the number of plant material units in the supply tray of a specific classification value exceeds the number of available locations in the corresponding further tray, said placing comprises:

transferring plant material units with the specific classification value to the corresponding further tray until the corresponding further tray is occupied;

subsequently for all other classification values for which a further tray is available, placing plant material units with an assigned classification value in a further tray dedicated to plant material units of said assigned classification value until all plant material units of said assigned classification value have been removed from the supply tray; and transferring remaining plant material units with the specific classification value in the supply tray to a further corresponding further tray.

4. The method according to, claim 1, wherein the robot comprises a robot arm provided with a plurality of gripping elements, each gripping element being configured to pick-up a single plant material unit, the gripping elements being capable of simultaneously picking up adjacent plant material units in the supply tray, the method further comprising picking up the plant material units up to full capacity of the gripping elements in ascending order of number of pick-ups.

5. The method according to claim 4, wherein the method further comprises:

determining a number and position of empty spaces in a further tray;

identifying a full capacity portion of the empty spaces as spaces in which plant material units are placeable with the plurality of gripping elements being used at full capacity;

picking up plant material units from the supply tray up to full capacity of the gripping elements and placing the plant material units in the identified empty spaces;

picking up remaining plant material units to be placed in the respective further tray and placing said remaining plant material units in empty places outside the full capacity portion.

6. The method according to claim 1, wherein one or more further trays comprise a plurality of cells in a two-dimensional array for accommodating the plant material units, and wherein placing plant material units in the one or more further trays comprises placing the plant material units in corresponding cells.

7. The method according to claim 6, wherein the plant material units are placed in a predetermined portion of the cells, the other cells remaining empty.

8. The method according to claim 6, wherein the distance between adjacent cells of the one or more further trays is greater than the distance between adjacent plant material units in the supply tray.

9. The method according to claim 1, wherein the supply tray is movable in a substantially horizontal first direction during sorting, while the further trays are stationary during sorting.

10. The method according to claim 1, wherein assigning a classification value to each of the plant material units the supply tray is based on the number of pixels within a predetermined color range per plant material unit in the image.

11. A computer readable medium having computer readable instructions stored thereon for performing, when executed by a processor, the method as defined by claim 1.

12. An apparatus for sorting plant material units, such as seedlings, arranged in a two-dimensional array in a supply tray by distributing the plant material units over a plurality of further trays configured to accommodate plant material units in a further two-dimensional array, each further tray being dedicated to plant material units with a specific classification value assigned to it, the apparatus comprising:

a supply line for supplying the plant material units, in said two-dimensional array in said supply tray;

multiple further supply lines for supplying the further trays;

a camera system comprising one or more cameras for obtaining an image of the two-dimensional array of plant material units in the supply tray;

a control unit communicatively connected to the camera system, the control unit comprising a processor for assigning a classification value to each of the plant material units within the two-dimensional array of plant material units in said supply tray on the basis of the image obtained with the camera system; and a robot communicatively connected to the control unit, the robot being configured to sort the plant material units on the basis of the assigned classification value by transferring plant material units with the same assigned classification value directly from the supply tray to the corresponding further tray.

13. The apparatus according to claim 12, wherein the supply line is oriented in a first horizontal direction, and the one or more of the further supply lines are oriented in a second horizontal direction, the first horizontal direction being different from the second horizontal direction.

14. The apparatus according to claim 13, wherein the first direction is substantially perpendicular to the second direction.

15. The apparatus according to claim 13, wherein the supply line is located at a first height level, and the multiple further supply lines are located at a second height level, the first height level being different from the second height level.

16. The apparatus according to claim 12, further comprising multiple discharge lines for removal of further trays supplied via corresponding further supply lines.

17. The apparatus according to claim 16, wherein the discharge lines take the form of gravity lanes.

18. The apparatus according to claim 12, wherein at least two of the further supply lines are substantially parallel to each other and separated by a distance forming a space, the space being sufficiently large for the robot to transfer plant material units through said space.

19. The apparatus according to claim 12, wherein the robot comprises one or more gripping elements for picking up plant material units in the supply tray.

20. The apparatus according to claim 12, further comprising a clamping arrangement for clamping the supply tray, the clamping arrangement being moveable along the supply line.

* * * * *